(12) United States Patent
Ta et al.

(10) Patent No.: US 11,416,879 B1
(45) Date of Patent: Aug. 16, 2022

(54) ADOPTION ANALYTIC BASED FUNCTIONALITY

(71) Applicant: Workday, Inc., Pleasanton, CA (US)

(72) Inventors: Robert Nam-Ngan Ta, Oakland, CA (US); Alexander Gallad Jones, Oakland, CA (US); Dean Daniel Reina, Oakland, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/898,303

(22) Filed: Jun. 10, 2020

(51) Int. Cl.
*G06Q 10/00* (2012.01)
*G06Q 30/02* (2012.01)
*G06Q 10/06* (2012.01)

(52) U.S. Cl.
CPC ... *G06Q 30/0201* (2013.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 2008/0167936 A1* | 7/2008 | Kapoor | G06Q 30/0201 | 705/7.29 |
| 2009/0281867 A1* | 11/2009 | Sievenpiper | G06Q 30/012 | 705/7.29 |
| 2011/0041077 A1* | 2/2011 | Reiner | G06Q 30/02 | 715/745 |
| 2012/0209663 A1* | 8/2012 | Gaskins, Jr. | G06Q 10/063 | 705/7.36 |
| 2014/0344013 A1* | 11/2014 | Karty | G06N 3/126 | 705/7.29 |
| 2016/0048847 A1* | 2/2016 | Bilotta | G06Q 50/01 | 705/7.29 |
| 2016/0196564 A1* | 7/2016 | Dadia | G06F 16/26 | 705/7.29 |
| 2016/0197865 A1* | 7/2016 | Kim | G06Q 30/02 | 709/206 |
| 2016/0203319 A1* | 7/2016 | Coen | H04L 63/20 | 726/25 |
| 2016/0275434 A1* | 9/2016 | Briganti | G06Q 10/06398 | |
| 2016/0313022 A1* | 10/2016 | Fisher | G05B 11/01 | |
| 2017/0161387 A1* | 6/2017 | Schuchardt | H04W 4/023 | |
| 2019/0012697 A1* | 1/2019 | Nemani | G06Q 30/0242 | |
| 2019/0102722 A1* | 4/2019 | Chetlur | G09B 5/14 | |
| 2019/0171902 A1* | 6/2019 | Yamaguchi | G06F 16/532 | |
| 2019/0347585 A1* | 11/2019 | Mowatt | H04L 67/22 | |
| 2021/0049227 A1* | 2/2021 | Clarke | G06F 16/986 | |
| 2021/0090095 A1* | 3/2021 | Sekharan | G06N 20/00 | |

OTHER PUBLICATIONS

Agrawal, Pulkit, How to Announce New Features to Drive Product Adoption, Nov. 28, 2018, Chameleon, https://www.trychameleon.com/blog/how-to-announce-new-features, p. 1-30. (Year: 2018).*

* cited by examiner

*Primary Examiner* — Joseph M Waesco
(74) *Attorney, Agent, or Firm* — Van Pelt, Yi & James LLP

(57) ABSTRACT

A system for triggering based on analytics comprises a storage device and a processor. The storage device is configured to store customer adoption data. A processor is configured to receive the customer adoption data; determine an under-used product feature based at least in part on the customer adoption data, wherein the customer adoption data is stored in the storage device; and determine and set a trigger for training the under-used product feature based at least in part on the customer adoption data.

20 Claims, 6 Drawing Sheets

US 11,416,879 B1

ADOPTION ANALYTIC BASED FUNCTIONALITY

BACKGROUND OF THE INVENTION

Software systems in the form of cloud-based services often provide product features that can be remotely enabled. However, it is difficult to determine whether the features have been adopted and/or are being appropriately used. The current landscape of adoption analytics is heavily dependent on usage metrics. The usage metrics, however, often lack context as to what they're measuring, how they're measuring it, and why it's worth measuring creating a problem for the usefulness of the usage metrics.

BRIEF DESCRIPTION OF THE DRAWINGS

Various embodiments of the invention are disclosed in the following detailed description and the accompanying drawings.

DETAILED DESCRIPTION

Figure 1:
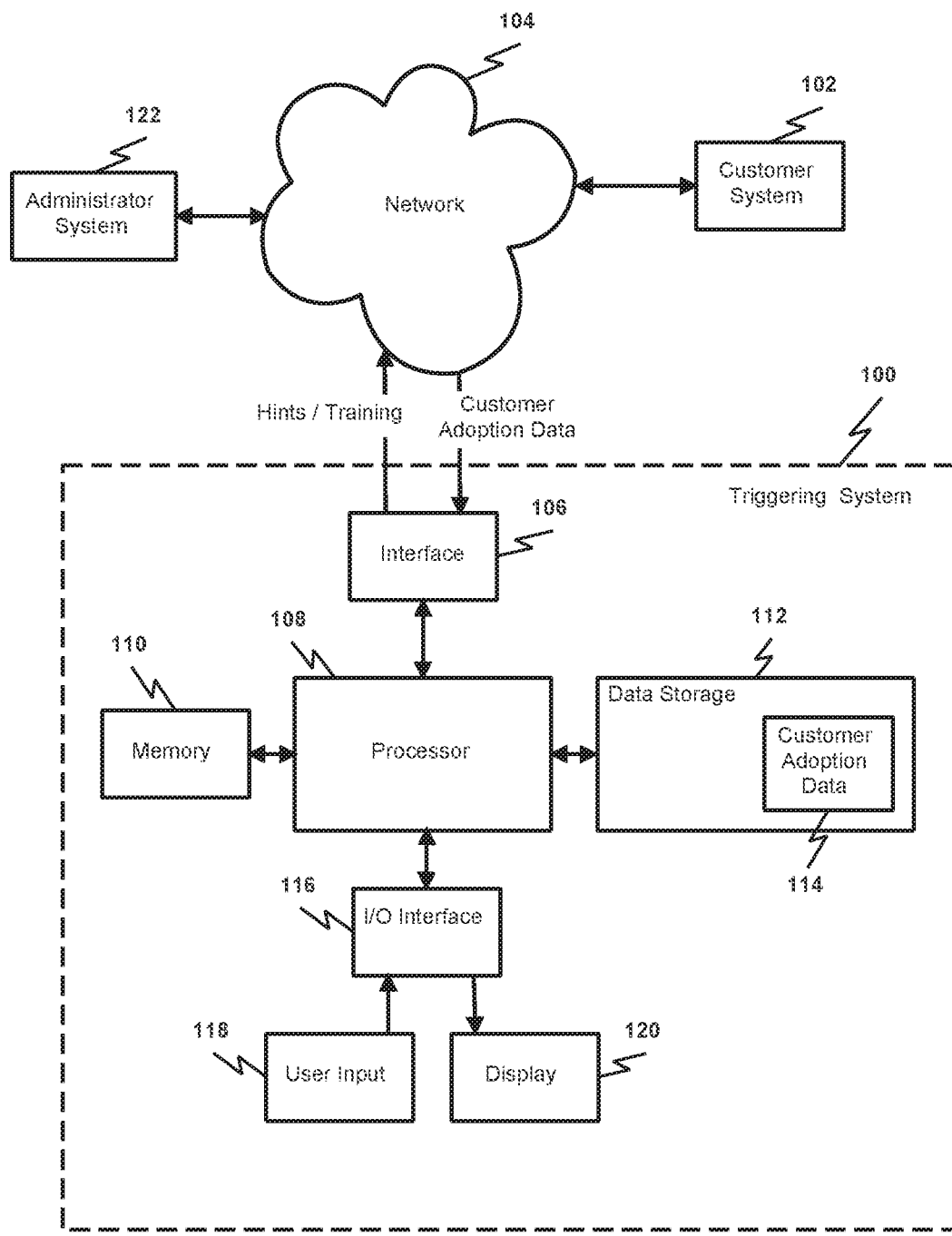
FIG. 1 is a block diagram illustrating an embodiment of a system for triggering based on customer adoption data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

A system for triggering based on analytics is disclosed. The system comprises a storage device and a processor. The storage device is configured to store customer adoption data. The processor is configured to receive the customer adoption data; determine an under-used product feature based at least in part on the customer adoption data, wherein the customer adoption data is stored in the storage device; and determine and set a trigger for training the under-used product feature based at least in part on the customer adoption data.

Software systems provided as cloud-based services are often provided with features that can be remotely enabled. However, it is difficult to determine whether the features are being appropriately used. The system improves the computer system by determining under-used or un-used features and providing automated training, automated enablement, and/or automated installation of features.

The current landscape of customer adoption analytics is heavily dependent on usage metrics. The usage metrics often lack context as to what they're measuring, how they're measuring it, and why it's worth measuring. For example, accumulating usage metrics without understanding how they are linked to one or more value drivers fails to guide useful product development. For example, a value driver is a capability that adds worth to a product, service, or brand. More specifically, a value driver refers to those activities or capabilities that add profitability, reduce risk, and promote growth in accordance with strategic goals. Such goals can include increasing an enterprise's value, competitive edge, and customer appeal.

The disclosed system improves the performance of customer adoption analytics by linking a customer's value drivers to quantitative usage metrics (e.g., a usage metric linked to a product capability or feature that supports one or more of a customer's value drivers). For example, a Key Performance Indicator (KPI) such as the ratio of HR (Human Resource) administrative employees to non-HR employees is a measurable business outcome linked to the value driver of improved HR efficiency. In this example, product capabilities (e.g., a product capability comprising one or more features) that support improving the overall KPI may include the ability to measure trends in employee staffing (e.g., employee headcount, turnover, compensation, promotions, changes in position, addition or deletion of additional jobs, etc.) and skills (e.g., a more skillful HR employee may be able to manage a greater number of non-HR employees and/or a more skillful non-HR employee may require less HR support).

A product capability or feature is a specific solution to address particular business requirements—for example, capability 1) hire/onboarding functionality comprised of features like a tailored onboarding experience or preventing duplicate records; capability 2) data privacy and purging comprising of the ability to purge customer data for General Data Protection Regulation (GDPR) compliance or data scrambling to assist with privacy; capability 3) payroll employee mobility including functionality like international assignments or trailing payments; capability 4) configurable time off calculations including functionality such as consecutive day overtime or predictive shift calculation; and/or capability 5) supplier invoicing including features such as billable supplier invoices or direct inter-company supplier invoices.

Linking product feature usage metrics (i.e., metric parameters) to product capabilities that support improving the overall KPI enables an automated process to (i) monitor customer adoption and use of such product features; (ii) train customers on the installation and/or use of such product features; (iii) automatically install or enable such product features; and/or (iv) provide reports that measure product efficacy as a function of customer adoption and usage.

Metric parameters comprise indicators of one or more levels of product feature usage. For example, determining the state of a metric parameter indicates whether the product is installed, enabled, adopted (e.g., at a novice level), or is being sufficiently used (e.g., at an intermediate or advanced level), etc. In various embodiments, determining the state of the metric parameter comprises determining a state of one or more of the following: an installation metric, an enablement metric, an adoption metric, a usage metric, and/or any other appropriate metric. The set of metric parameter states for one or more customer product features (i.e., customer adoption data) provides a quantitative assessment of a customer's level and proficiency of product feature usage. In various embodiments, the metric parameters further indicate whether one or more attempts have been made to train customers on the installation and/or use of product features.

The metric parameters are linked to a trigger (e.g., a software trigger that indicates to a computer program to branch into a service routine). For example, an installation metric is linked to an installation trigger, an enablement metric is linked to an enablement trigger, an adoption metric is linked to an adoption trigger, and/or a usage metric is linked to an advanced usage trigger.

For example, if a metric parameter indicates a product feature is being under-used, a computer program is instructed to set a trigger to start a service routine to provide hints and/or training to the customer (e.g., to improve the customer's usage of the product feature). As another example, if the state of a metric parameter indicates a product feature is not installed, a computer program is instructed to set an installation trigger to start a service routine to provide hints and/or training to the customer as to how to install the product feature, and/or trigger an automatic installation of the product feature.

For example, a hint comprises educational documents and/or videos that describe one or more product features and training comprises lessons (e.g., educational documents and/or videos) on how to use and apply the product feature (e.g., towards improving a customer's KPIs).

In various embodiments, a hint or training is automatically provided (e.g., via mail, email, text messaging, etc.). In various embodiments, a hint or training is provided in the body of the message, or indirectly by pointing to one or more weblinks. In various embodiments, a hint or training informs a customer how the product feature links to the customer's value drivers and/or KPIs.

In various embodiments, the triggers are set to immediately start a service routine, to start a service routine at some periodic date and time (e.g., as part of batch processing multiple trigger requests), to start a service routine that sends a notice informing a reviewer (e.g., a human reviewer and/or a computer review process) that a decision is required before starting the service routine that provides hints and/or training to the customer, or to trigger any appropriate action or service routine that improves customer adoption. In some embodiments, a trigger comprises a setting that is checked by an engine continuously, periodically, by an interrupt, or any other appropriate manner, and the engine upon seeing that the trigger is set executes an appropriate action or service in response to the trigger.

In some embodiments, the trigger can be set according to how many attempts have been made (e.g., as indicated by the associated metric parameter) to provide hints and/or train customers on the installation and/or use of such product features.

For example, when a provided installation hint and/or training has been unsuccessful in leading a customer to install a product feature—for example, after waiting a set amount of time (e.g., three days, one week, two weeks, one month, or any appropriate amount of time)—the trigger is set to provide one or more additional hints and/or training. In various embodiments, the one or more additional hints and/or training are the same as the original hint and/or training, are edited versions of the original hint and/or training, are entirely new hints and/or trainings, or are varied in any appropriate manner to aid in improving customer adoption. In some embodiments, after any number of hints and/or trainings are provided (including 0, 1, 2, 3, 4, 5, 10, 20, 30, 40, etc.), the trigger is set to start a service routine that automatically installs the product feature. For example, after a customer has received a hint and/or training about the usefulness of the product feature towards improving the customer's business (e.g., as reflected via a customer's KPIs), but has failed to install the product feature, the trigger is set to automatically start a service routine that automatically installs the product feature. In this example, after the service routine automatically installs the product feature, the associated metric parameter (e.g., an installation metric) is updated to indicate that the product feature is installed, and the customer next needs to enable the product feature prior to use. In some embodiments, once the installation metric has been updated, a next trigger (e.g., an enablement trigger) is set to initiate automatic training (e.g., to train the customer as to how to enable and/or use the product feature).

As customer adoption of a product feature increases from installation to enablement, additional metric parameters and triggers are employed to further increase customer proficiency and usage of the product feature. For example, after a customer has received automated training on how to use the product feature, an adoption metric is used to monitor the amount of usage of the product feature (e.g., by the number and/or length of times that the customer accesses the product feature, by how many reports a customer generates using the product feature, or by any other appropriate metric indicating product feature usage level). Once the adoption metric indicates a level of use above a first threshold of use (e.g., accessing the product feature more than three, five, seven, ten, or any number of times, or generating more than two, four, five, eight, or any number of reports, etc.), the adoption metric is set to indicate that the product feature has been adopted, and the customer is ready for advanced training as to how to further improve proficiency in using the product feature towards improving the customer's KPIs. When a customer reaches a level of proficiency above a second threshold (e.g., is considered an advanced user as indicated by a usage metric—such as a user that has used a feature 10, 100, 1000, or 10,000 times or any other appropriate threshold), an advanced usage trigger linked to the usage metric is used to start a service routine that reviews all the customer's value drivers and related KPIs to discover whether there are other helpful under-used product features (e.g., under-used product features not being tracked by a metric parameter) to further assist improvement of the customer's value drivers.

When all available under-used product features have been identified, and the customer made aware of their potential benefit, the service routine is used to trigger a review (e.g., a customer review to discuss whether there may be other conceivable product features not yet available that would help guide the service provider's product development efforts).

The system for triggering based on analytics improves the computer system by making software usage more comprehensive and effective. This improves efficiency of usage for the computer system. Automatic training and hints allow more effective use of the computer system by a user and enables more efficient use of computation resources (e.g., processor and memory resources) through effective use of software capabilities.

FIG. 1 is a block diagram illustrating an embodiment of a system for triggering based on customer adoption data. In the example shown, triggering system 100 is connected to a user using customer system 102 via network 104. In some embodiments, network 104 comprises a communication network. In various embodiments, network 104 comprises wired and/or wireless communication networks comprising standard, hybrid, and/or proprietary networks (e.g., a local area network, a wide area network, a virtual private network, etc.), proxy servers, and data centers. In some embodiments, network 104 comprises a content distribution network. In various embodiments, network 104 and/or triggering system 100 comprise components of a cloud computing platform— for example, comprising a front end platform (e.g., a fat client, a thin client, etc.), a back end platform (e.g., servers, data storage, etc.), a cloud based delivery system, and a network (e.g., Internet, an intranet, an intercloud, etc.).

In the example shown, triggering system 100 comprises interface 106, processor 108, memory 110, data storage 112, I/O interface 116, user input 118, and display 120. In various embodiments, a user (e.g., a computer programmer, a product development engineer, a business developer, a system administrator, etc.) inputs computer code or queries (e.g., via user input 118 and I/O interface 116) to run on processor 108 (e.g., to develop and/or test one or more product features, to generate or review customer adoption data, to update or add product features, to perform system maintenance, etc.). Display 120 is used to monitor processor 108 output. In various embodiments, computer code, queries, and/or customer adoption data are stored in memory 110 (e.g., temporarily, long term, short term, etc.) for use by processor 108, and/or stored in data storage 112 for later retrieval (e.g., customer adoption data is stored in customer adoption data 114). In some embodiments, monitoring output is provided to an administrator system 122 and/or customer system 102 in communication with triggering system 100 via network 104. In some embodiments, administrator system 122 is used by an administrator administrating trigger system 100—for example, monitoring performance, providing software maintenance, handling bugs, crashes, or other system issues, etc.

In some embodiments, the customer adoption data is automatically logged as usage data (e.g., within customer adoption data 114) for a software functionality enabled in the system (e.g., within the system of customer system 102). In some embodiments, the usage data automatically triggers a service routine that indicates a charge for the software functionality (e.g., the usage data automatically triggers an automated invoicing program to initiate a charge or invoice for a feature). In some embodiments, the customer adoption data is used to determine a report (e.g., a report to a service provider generated by triggering system 100 indicating the level of a customer's usage of one or more product features).

In various embodiments, triggers (e.g., an installation trigger, an enablement trigger, an adoption trigger, and/or an advanced usage trigger) generated within triggering system 100 (e.g., by a computer program running on processor 108) are used to start a service routine to provide hints and/or training to the customer (e.g., via interface 106 and network 104). In various embodiments, the service routine that provides hints and/or training to the customer runs on processor 108, on one or more processors within customer system 102 (e.g., an enterprise application software system), or on one or more processors within a third-party service provider's computer system (not shown) (e.g., as part of a cloud-based computing platform service).

In some embodiments, training comprises lessons (e.g., educational documents and/or videos) on how to use and apply the product feature (e.g., to the customer's enterprise application software system). In some embodiments, training is regarding a software functionality already enabled in the system (e.g., the system of customer system 102). In some embodiments, training is regarding a new software functionality not enabled in the system. In some embodiments, training comprises instructions on how to enable the product feature. In some embodiments, training is automatically initiated (e.g., as indicated by an installation trigger). In some embodiments, training comprises automatically installing a new software functionality not installed in the system based at least in part on the customer adoption data. In some embodiments, training comprises automatically enabling a new software functionality not enabled in the system based at least in part on the customer adoption data. In some embodiments, customer adoption data is used to inform the disabling of a software functionality enabled in the system (e.g., where repeated hints and/or training efforts have proven unsuccessful).

In some embodiments, training is automatically executed for an employee with one or more roles related to an adoption of the under-used product feature. In some embodiments, the employee with one or more roles related to an adoption of the under-used product feature is first checked (e.g., via security settings) for whether the employee is allowed to receive such training (e.g., some levels of employee may not be allowed to be trained for giving raises, running budget analyses, etc.). In some embodiments, the one or more roles is/are determined based at least in part on the customer adoption data. In some embodiments, the one or more roles is/are determined based at least in part on determining whether the employee is currently certified for using the under-used product feature. In some embodiments, the training includes certification training (e.g., certification training in human capital management, project management, finance, payroll, reporting, etc.). In some embodiments, training is requested by the Customer (e.g., in response to receiving a hint about the product feature).

In various embodiments, metric parameters (e.g., customer adoption data) are transmitted from customer system 102 to triggering system 100 (e.g., via network 104) for processing by a computer program (e.g., running on processor 108). In various embodiments, the metric parameters comprise an installation metric, an enablement metric, an adoption metric, and/or a usage metric, wherein the metric parameter is used to determine whether a product feature has been installed, enabled, adopted, and/or is being sufficiently used. In some embodiments, determining whether a product feature has been adopted comprises determining whether the product feature is being used above a first threshold level, and determining whether a product feature is being sufficiently used comprises determining whether the product feature is being used above a second threshold level.

For example, if a metric parameter indicates a product feature is being under-used (e.g., is being used below a first or second threshold level), a computer program running on processor 108 is instructed to set a trigger to start a service routine to provide hints and/or training to the customer; and/or if the product feature is not installed, to trigger an automatic installation of the product feature. In some embodiments, a computer program running on processor 108 updates the metric parameter to indicate how many attempts have been made to train customers on the installation and/or use of one or more product features.

When all available under-used product features have been identified (e.g., by a computer program running on processor 108), and the customer made aware of their potential benefit (e.g., via an automated hint and/or training), a service routine (e.g., running on processor 108) is used to trigger a review (e.g., an email is sent to the service provider indicating a review is required).

Figure 2:
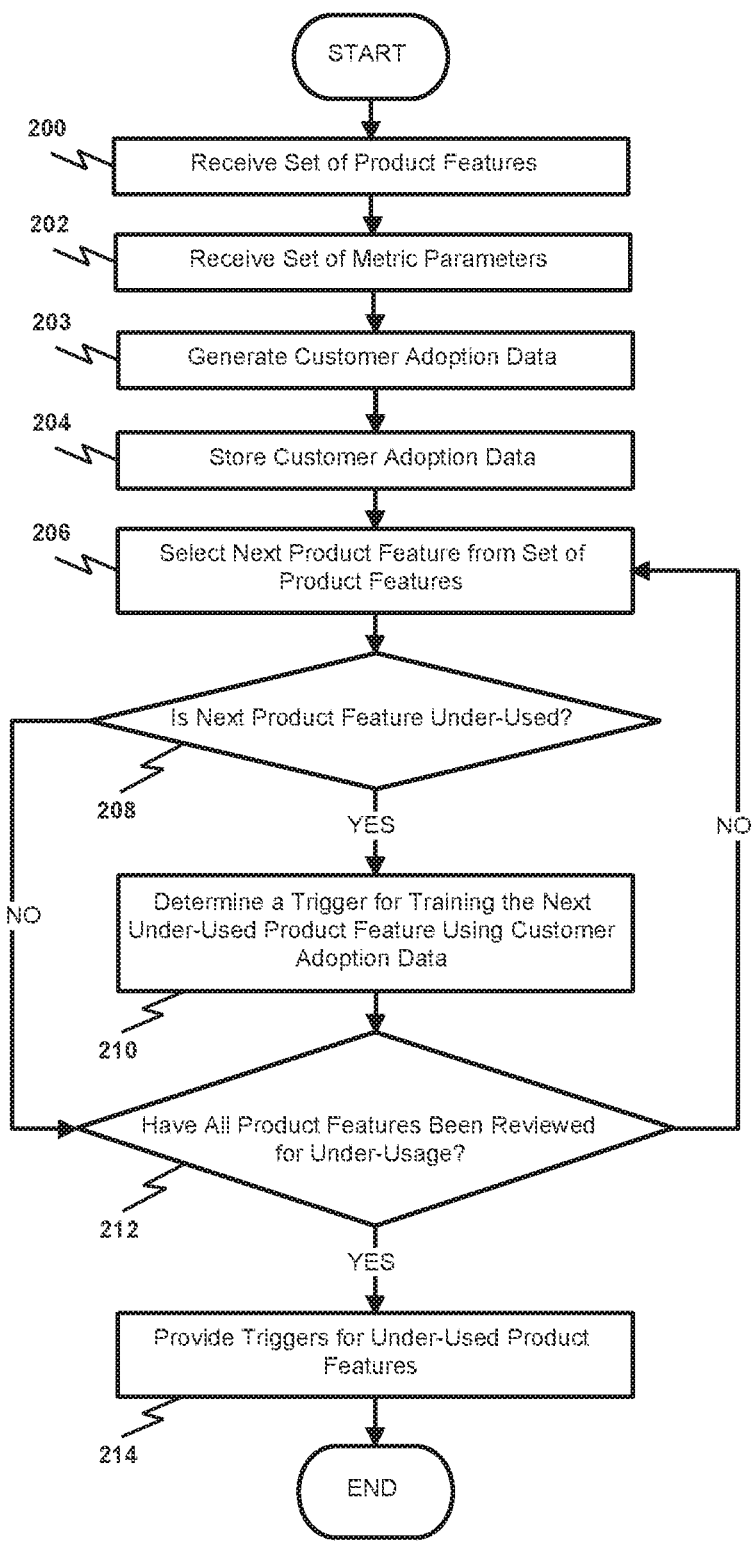
FIG. 2 is a flow diagram illustrating an embodiment of a method for determining triggers.

FIG. 2 is a flow diagram illustrating an embodiment of a method for determining triggers. In some embodiments, the process of FIG. 2 is executed using the processor of triggering system 100 of FIG. 1. In various embodiments, the process of FIG. 2 is executed in whole or in part using any appropriate combination of one or more processors.

In 200, a set of product features is received. For example, a set of product features (e.g., product features that assist with career and development planning, employee benefits administration, employee skills tracking, time/absence tracking, trends in employee staffing, payroll, procurement, reports, etc.) is received from a customer system, an administrator system, and/or a triggering system (e.g., from data storage devices within the customer system, administrator system, and/or the triggering system). In 202, a set of metric parameters is received. For example, a set of metric parameters (e.g., comprising one or more installation metrics, enablement metrics, adoption metrics, and/or usage metrics) is received from a customer system, administrator system, and/or a triggering system. In 203, customer adoption data is generated. For example, customer adoption data is generated by a computer program that determines the state of each metric parameter associated with each product feature (e.g., as shown in the process flow diagram of FIG. 3).

In 204, customer adoption data is stored. For example, customer adoption data is stored in one or more data storage devices within the customer system, the administrator system, and/or the triggering system. In 206, a next product feature is selected from a set of product features. In 208, it is determined whether the next product feature is under-used. For example, a next product feature is considered under-used when the number of uses per time period is under a threshold. In response to determining the next product feature is not under-used, control passes to 212. In response to determining the next product feature is under-used, the process flows to 210.

In 210, a trigger for training the next under-used product feature is determined and set using customer adoption data. For example, for a given under-used product feature, a table look up enables the determination and setting of a trigger. For example, a table that maps the state of an associated metric parameter to the under-used product feature is used to determine and set the trigger. In various embodiments, an installation metric associated with the under-used product feature indicating that the under-used product feature is not installed is used to set an installation trigger; an enablement metric associated with the under-used product feature indicating that the under-used product feature is not enabled is used to set an enablement trigger; an adoption metric associated with the under-used product feature indicating that the under-used product feature is not adopted is used to set an adoption trigger; a usage metric associated with the under-used product feature indicating that the under-used product feature is not being sufficiently used is used to set an advanced usage trigger; or any other appropriate mapping between an under-used or uninstalled product feature, its associated metric parameter, and a trigger.

In 212, it is determined whether all product features have been reviewed for under-usage (e.g., by reviewing the states of all the metric parameters associated with the product features received in 200). In response to determining that all product features have not been reviewed for under-usage, control passes to 206, and a next product feature is selected from the set of product features. In response to determining that all product features have been reviewed for under-usage, the process flows to 214. In 214, triggers are provided for the under-used product features, and the process ends. For example, triggers for the under-used product features are provided to a computer program that uses the triggers to determine and provide training, and the process ends.

Figure 3:
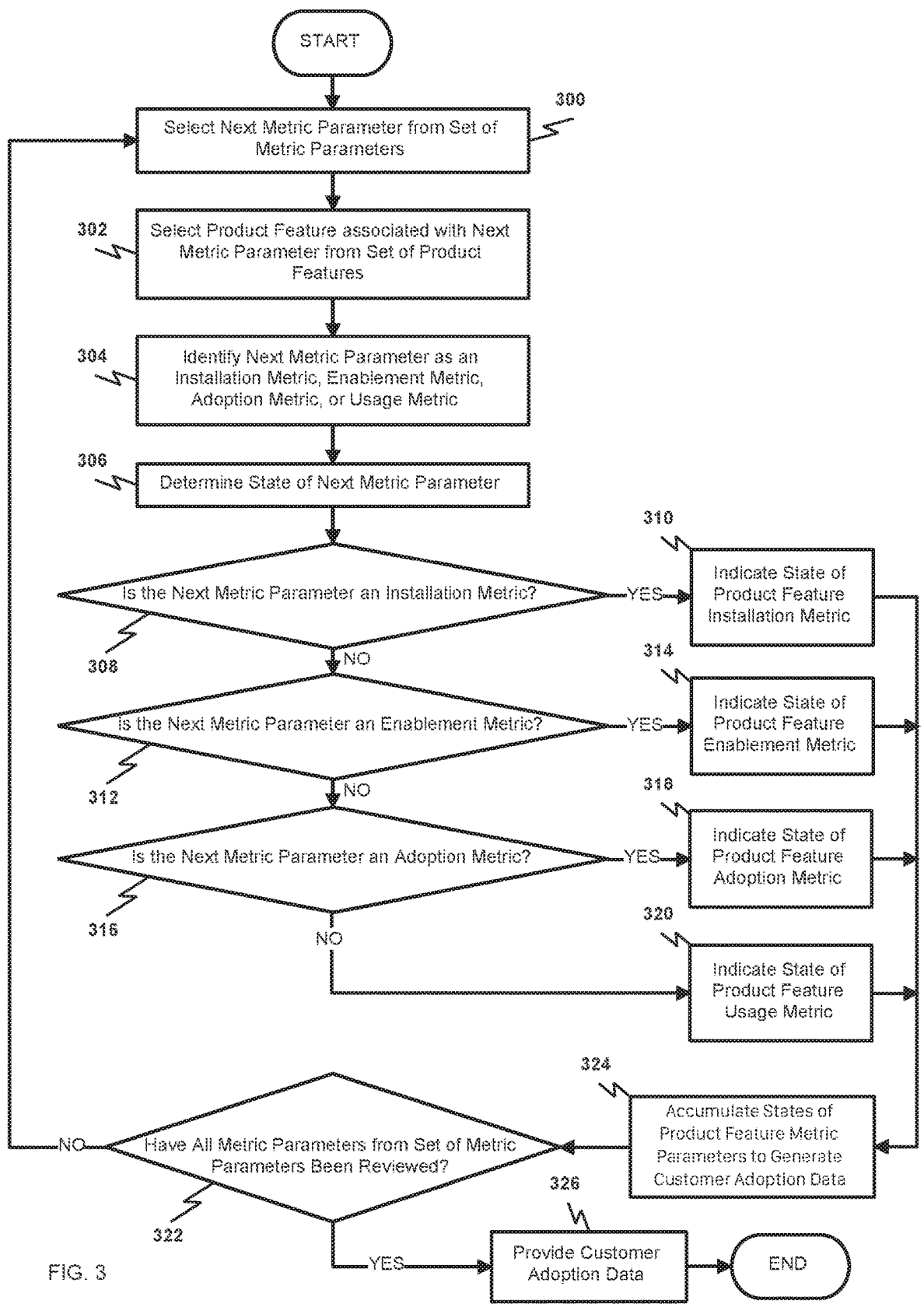
FIG. 3 is a flow diagram illustrating an embodiment of a method for generating customer adoption data.

FIG. 3 is a flow diagram illustrating an embodiment of a method for generating customer adoption data (e.g., customer adoption data used in the process of FIG. 2). In some embodiments, the process of FIG. 3 is executed using the processor of triggering system 100 of FIG. 1. In various embodiments, the process of FIG. 3 is executed in whole or in part using any appropriate combination of one or more processors.

In 300, a next metric parameter is selected from a set of metric parameters. For example, a next metric parameter (e.g., an installation metric, an enablement metric, an adoption metric, or a usage metric) is selected from a set of metric parameters received using a customer system, administrator system, and/or a triggering system. In 302, a Product Feature associated with the next metric parameter is selected from a set of product features. For example, a selection of a product feature is selected from a set of product features received from a customer system, an administrator system, and/or a triggering system. In 304, the next metric parameter is identified as an installation metric, enablement metric, adoption metric, or a usage metric. For example, the next metric parameter is identified by pairing the next metric parameter with an associated symbolic name. In 306, the State of the next metric parameter is determined. For example, determining the state of a metric parameter comprises determining whether the product feature associated with the metric parameter has been installed, enabled, adopted, or is being sufficiently used.

In 308, it is determined whether the next metric parameter is an installation metric. For example, the system determines whether the next metric parameter is an installation metric by examining the associated information for the next metric parameter. In response to determining the next metric parameter is an installation metric, the process flows to 310. In 310, the state of the product feature installation metric is indicated, and control passes to 324. For example, a state of the product feature installation metric is stored in a look-up table (e.g., one or more of: installed, not installed, version number, date of installation, update availability, etc.). In response to determining the next metric parameter is not an installation metric, the control passes to 312.

In 312, it is determined whether the next metric parameter is an enablement metric. For example, the system determines whether the next metric parameter is an enablement metric by examining the associated information for the next metric parameter. In response to determining the next metric parameter is an enablement metric, the process flows to 314. In 314, the state of the product feature enablement metric is indicated, and control passes to 324. For example, a state of the product feature enablement metric is stored in a look-up table (e.g., one or more of: enabled, not enabled, version number, date of enablement, update availability, etc.). In response to determining the next metric parameter is not an enablement metric, the control passes to 316.

In 316, it is determined whether the next metric parameter is an adoption. For example, the system determines whether the next metric parameter is an adoption metric by examining the associated information for the next metric parameter. In response to determining the next metric parameter is an adoption metric, the process flows to 318. In 318, the state of the product feature adoption metric is indicated, and control passes to 324. For example, a state of the product feature adoption metric is stored in a look-up table (e.g., one or more of: adopted, not adopted, version number, date of adoption, update availability, etc.). In response to determining the next metric parameter is not an adoption metric, the control passes to 320.

In 320, the state of the product feature usage metric is, and control passes to 324. For example, a state of the product feature usage metric is stored in a look-up table (e.g., one or more of: amount of usage, type of usage, version number, date of usage, update availability, etc.). In 324, the states of the product feature metric parameters are accumulated to generate customer adoption data, and control passes to 322. For example, states of the product feature metric parameters are accumulated in a look-up table or stored in memory. In 322, it is determined whether all metric parameters from the set of metric parameters have been reviewed. For example, automatic variables associated with the metric parameters (e.g., generated by the system review-function call routine) indicate whether the metric parameter has been reviewed.

In response to determining that all metric parameters have not been reviewed, control passes to 300, and a next metric parameter is selected from the set of metric parameters. In response to determining that all metric parameters have been reviewed, control passes to 326. In 326, the customer adoption data is provided, and the process ends. For example, customer adoption data is provided to the system that stores and uses the customer adoption data to determine and set triggers for training under-used product features (e.g., as shown in the process flow diagram of FIG. 2), and the process ends.

Figure 4:
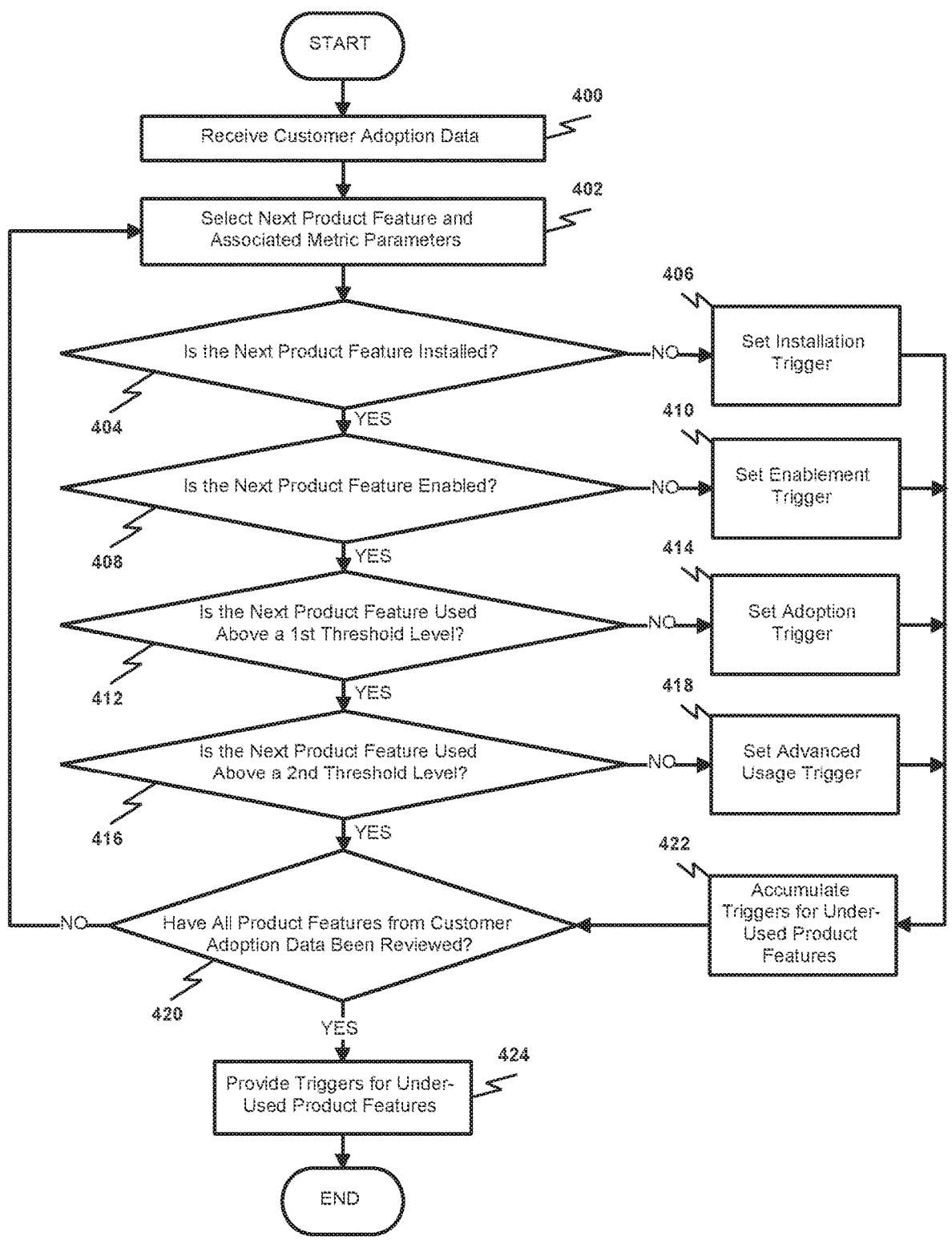
FIG. 4 is a flow diagram illustrating an embodiment of a method for determining and setting triggers.

FIG. 4 is a flow diagram illustrating an embodiment of a method for determining and setting triggers. In some embodiments, the triggers are as determined and set in the process of FIG. 2). In some embodiments, the process of FIG. 4 is executed using the processor of triggering system 100 of FIG. 1. In various embodiments, the process of FIG. 4 is executed in whole or in part using any appropriate combination of one or more processors.

In 400, customer adoption data is received. For example, customer adoption data comprising a set of metric parameter states for one or more customer product features is received. In 402, a next product feature and the associated metric parameters are selected. For example, a next product feature and associated metric parameters are selected from a set of product features and associated metric parameters. In 404, it is determined whether the next product feature is installed. For example, determining whether the next product feature is installed is determined by examining the state of the installation metric associated with the next product feature. In response to determining that the next product feature is not installed, the process flows 406. In 406, an installation trigger is set, and control passes to 422. For example, a table that maps the state of the installation metric to the next product feature is used to enable the setting of the installation trigger, and control passes to 422. In 422, triggers are accumulated for the under-used product features. For example, triggers are accumulated in computer memory and/or stored in a data storage device). In response to determining that the next product feature is installed, control passes to 408.

In 408, it is determined whether the next product feature is enabled. For example, determining whether the next product feature is enabled is determined by examining the state of the installation metric associated with the next product feature. In response to determining that the next product feature is not enabled, the process flows 410. In 410, an enablement trigger is set, and control passes to 422. For example, a table that maps the state of the enablement metric to the next product feature is used to enable the setting of the enablement trigger, and control passes to 422. In response to determining that the next product feature is enabled, control passes to 412.

In 412, it is determined whether the next product feature is used above a first threshold level. For example, determining whether the next product feature is used above a first threshold level is determined by examining the state of the adoption metric associated with the next product feature. For example, the adoption metric comprises more than one variable, each variable indicating the use of the product feature via different metrics (e.g., the number of times the product feature was accessed, the number of output files of a certain type generated, or any other appropriate indicator of product feature usage). For example, a first threshold of greater than five custom reports (or any other appropriate first threshold value) that is of the matrix type would indicate the customer has adopted a specific type of reporting (e.g., matrix reporting).

In response to determining that the next product feature is not used above a first threshold level, the process flows 414. In 414, an adoption trigger is set, and control passes to 422. For example, a table that maps the state of the adoption metric to the next product feature is used to enable the setting of the adoption trigger, and control passes to 422. In response to determining that the next product feature is used above a first threshold level, control passes to 416.

In 416, it is determined whether the next product feature is used above a second threshold level. For example, determining whether the next product feature is used above a second threshold level is determined by examining the state of the usage metric associated with the next product feature. For example, the usage metric comprises more than one variable, each variable indicating the use of the product feature via different metrics (e.g., the number of times the product feature was accessed, the number of output files of a certain type generated, the percentage improvement in an associated KPI, or any other appropriate indicator of product feature usage). For example, a second threshold of greater than five thousand custom reports (or any other appropriate second threshold value) that is of the matrix type would indicate the customer is an advanced user of matrix reporting and that the product feature is being sufficiently used. In response to determining that the next product feature is not used above a second threshold level, the process flows 418. In 418, an advanced usage trigger is set, and control passes to 422. For example, a table that maps the state of the usage metric to the next product feature is used to enable the setting of the advanced usage trigger, and control passes to 422. In response to determining that the next product feature is used above a second threshold level, control passes to 420.

In 420, it is determined whether all product features from the customer adoption data have been reviewed. For example, automatic variables associated with the product features (e.g., generated by a computer program review-function call routine) indicate whether the product feature has been reviewed. In response to determining that all product features from the customer adoption data have not been reviewed, control passes to 402, and a next product feature and the associated metric parameters are selected. In response to determining that all product features from the customer adoption data have been reviewed, control passes to 424. In 424, triggers are provided for the under-used product features, and the process ends. For example, triggers for the under-used product features are provided to a computer program that uses the triggers to determine and provide training appropriate to the trigger type and under-used product feature (e.g., as shown in the process flow diagrams of FIGS. 5A and 5B), and the process ends.

Figure 5A:
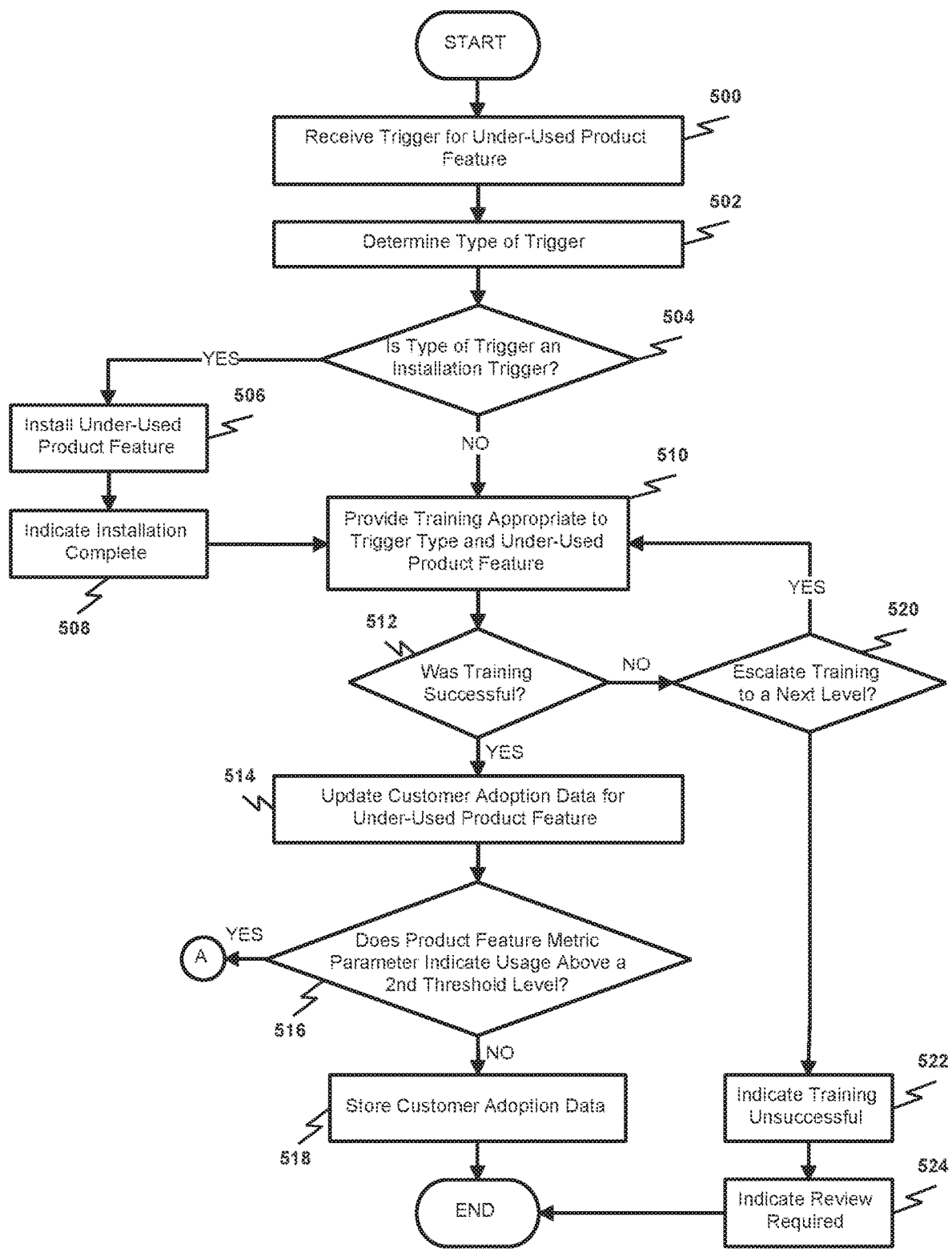
FIGS. 5A and 5B are a flow diagram illustrating an embodiment of a method for automatically using triggers to provide training of under-used product features.
Figure 5B:
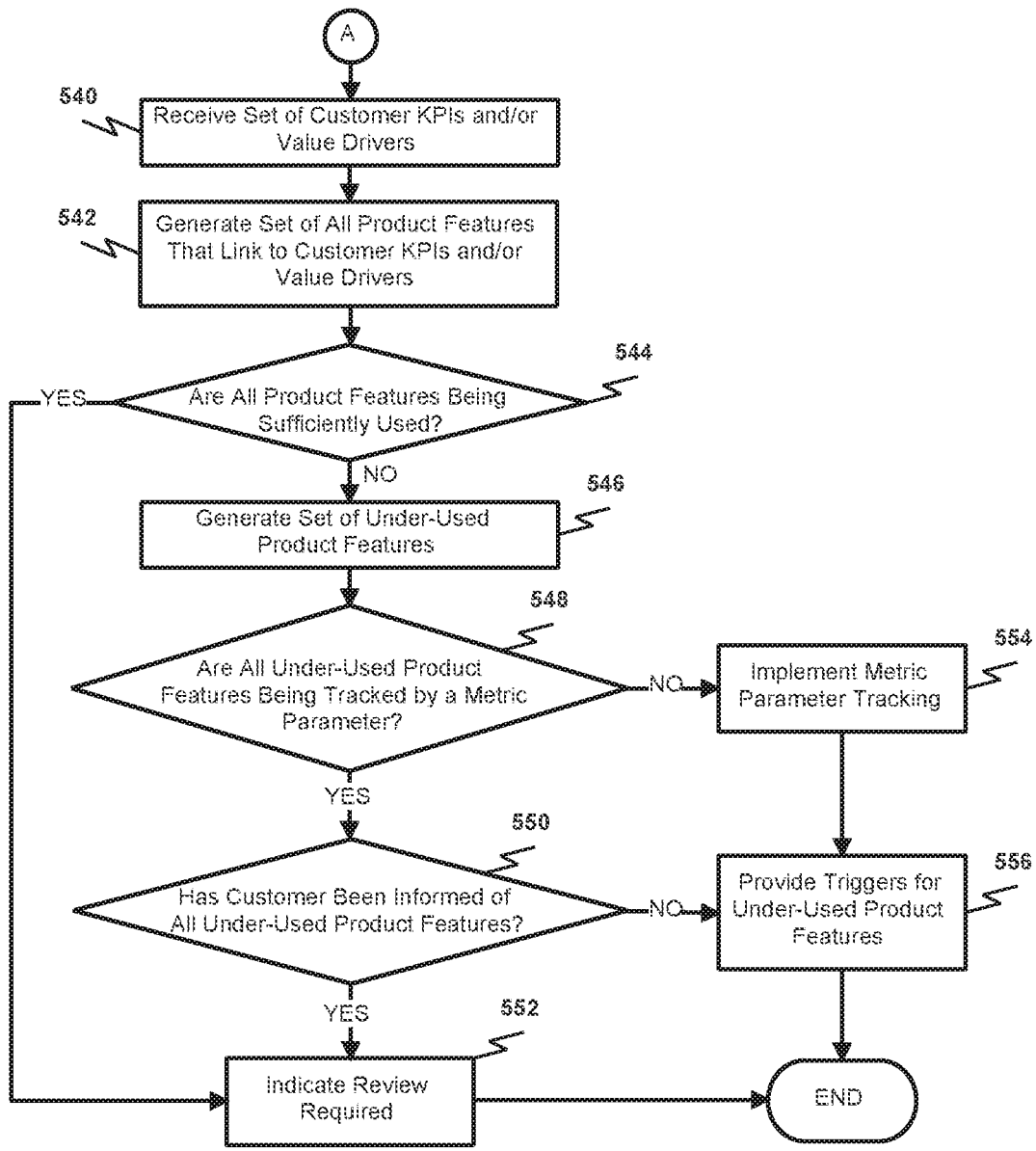

FIGS. 5A and 5B are a flow diagram illustrating an embodiment of a method for automatically using triggers to provide training of under-used product features. In some embodiments, the process of FIGS. 5A and 5B is executed using the processor of triggering system 100 of FIG. 1. In various embodiments, the process of FIGS. 5A and 5B is executed in whole or in part using any appropriate combination of one or more processors.

In 500, a trigger is received for the under-used product feature. For example, the system generates a trigger to indicate an under-used product features. In some embodiments, the trigger indicates to branch to a training routine. In 502, the type of trigger is determined. For example, it is determined whether the trigger is of an installation type, an enablement type, an adoption type, and/or an advanced usage type. In 504, it is determined whether the type of trigger is an installation trigger. For example, a table look-up enables the determination of a trigger type. In response to determining that the type of trigger is an Installation trigger, the process flows to 506. In 506, the under-used product feature is installed. For example, a service routine is triggered to automatically install the under-used product feature (e.g., on a customer's enterprise application software system). In some embodiments, the Installation trigger indicates to the system to branch into a training routine on how to install the under-used product feature. In 508, it is indicated that the installation is complete (e.g., it is indicated to the customer and the service provider that the installation is complete), and the process flows to 510. In various embodiments, when the installation is complete, the state of the installation metric for the under-used product feature is updated immediately, or at any appropriate time after the installation is complete (e.g., after training is provided on how to use the under-used product feature). In response to determining that the type of trigger is not an installation trigger, control also passes to 510.

In 510, training is provided appropriate to the type of trigger and the under-used product feature. For example, if the under-used product feature was just installed, training is provided appropriate to the recently installed under-used product feature. In various embodiments, wherein the under-used product feature was not automatically installed in response to the installation trigger, training is provided (e.g., to the customer) as to how to install the under-used product feature, information is provided about the benefits of the under-used product feature, and/or training is provided how to use the under-used product feature.

In various embodiments, wherein the type of trigger is an enablement trigger, training is provided as to how to enable the under-used product feature, information is provided about the benefits of the under-used product feature, and/or training is provided how to use the under-used product feature. In some embodiments, wherein the type of trigger is an enablement trigger, the under-used product feature is automatically enabled.

In various embodiments, wherein the type of trigger is an adoption trigger or an advanced usage trigger, training is provided as to how to improve usage of the under-used product feature and/or information is provided about the benefits of the under-used product feature (e.g., additional benefits and/or more detailed benefits than previously provided, how the under-used product feature can help, or has helped, improve a customer's KPIs, etc.).

In some embodiments, training comprises providing a hint. For example, a hint comprises educational documents and/or videos that describe one or more product features and training comprises lessons (e.g., educational documents and/or videos) on how to use and apply the product feature (e.g., towards improving a customer's KPIs).

In 512, it is determined whether the training was successful. For example, a review (e.g., by the system) of customer adoption data (e.g., of updated metric parameters obtained after the training was performed) determines whether the training was successful. For example, a review of updated customer adoption data is performed one or more times after the training is completed (e.g., after any appropriate time interval, after a set amount of time or times, in response to a customer indicating they have completed the training, or after any other indicator that the training was completed) to determine whether the training was successful. For example, determining whether the training was successful is indicated by the state of an enablement metric switching from disabled to enabled, by the state of an adoption metric switching from not being used above a first threshold to adopted, by the state of a usage metric switching from not being used above a second threshold to being sufficiently used, etc.).

In response to determining that the training was successful, the process flows to 514. In 514, the customer adoption data for the under-used product feature is updated. For example, the state of an enablement metric is updated (e.g., in a look-up table) from disabled to enabled, the state of an adoption metric is updated from not adopted to adopted, the state of a usage metric is updated from not being used above a second threshold to being sufficiently used, etc. In 516, it is determined whether the product feature metric parameter indicates usage above a second threshold level. For example, usage above a second threshold is determined based on the number of times the product feature was accessed by the user, the number of output files of a certain type generated, the percentage improvement of an associated KPI, or any other appropriate indicator of product feature usage above a second threshold.

In response to the product feature metric parameter indicating usage above a second threshold level, control passes to (A) of FIG. 5B. In response to the product feature metric parameter indicating usage is not above a second threshold level, the process flows to 518. In 518, the customer adoption data is stored (e.g., in one or more data storage devices of a customer system, an administrator system, and/or a triggering system), and the process ends.

In response to determining that the training was not successful, the control passes to 520. In 520, it is determined whether to escalate the training to a next level.

For example, when a provided training has been unsuccessful in leading a customer to install, enable, adopt, or sufficiently use a product feature, additional hints and/or training are provided to escalate the training to a next level. For example, escalating the training to a next level comprises one or more additional hints and/or training that are the same as the original hint and/or training, are edited versions of the original hint and/or training, are entirely new hints and/or trainings, or are varied in any appropriate manner to aid in improving customer adoption and usage.

In response to determining to escalate the training to a next level, control passes to 510, and training is provided appropriate to the type of trigger and the under-used product feature (e.g., training that has been escalated to a next level). In response to determining not to escalate the training to a next level, the process flows to 522. In 522, it is indicated that the training was unsuccessful (e.g., a metric parameter variable linked to the under-used product feature is used to indicate the training was unsuccessful). In some embodiments, another metric parameter variable is used to indicate how many attempts have been made to train customers appropriate to the type of trigger and the under-used product feature. In 524, it is indicated that a Review is required (e.g., an email is sent to the service provider indicating a review is required), and the process ends.

In the example shown in FIG. 5B, in response to the product feature metric parameter indicating usage above a second threshold level, in 540, a set of customer KPIs and/or value drivers are received. For example, a set of capabilities that add worth to a customer's product, service, or brand (i.e., value drivers), and their associated performance metrics (i.e., KPIs) are received. In 542, a set of all product features that are linked to the customer KPIs and/or value drivers is generated. For example, the KPI of the ratio of HR administrative employees to non-HR employees is linked to the value driver of improved HR efficiency via a look-up table. In 544, it is determined whether all product features are being sufficiently used. For example, the system is used to determine whether all product features are being sufficiently used by determining whether the state of the associated product feature usage metric indicates the product feature is being used above a second threshold level.

In response to determining that all product features are being sufficiently used, control passes to 552. In 552, it is indicated that a review is required, and the process ends. For example, a message (e.g., an email, a text, or any appropriate form of messaging) is sent to the service provider indicating a customer review is required (e.g., a review of the customer's value drivers, KPIs, business strategy, recent product or service offerings, etc.). For example, a review (e.g., by the service provider's business development group, product development group, and/or any appropriate group or individual) to discuss whether there may be other conceivable product features not yet available to offer to the customer to provide additional support of the customer's current and future strategic goals.

In response to determining that all product features are not being sufficiently used, the process flows to 546. In 546, a set of under-used product features is generated. For example, a table look up is used to generate a set of under-used product features from the set of all product features that are linked to the customer KPIs and/or value drivers. In 548, it is determined whether all under-used product features are being tracked by a metric parameter. For example, a table look-up is used to determine whether all under-used product features are being tracked by metric parameters. In response to determining that all under-used product features are being tracked, the process flows to 550. In 550, it is determined whether the customer has been informed of all the under-used product features. For example, a table look-up is used to determine whether the customer has been informed of all the under-used product features. In response to determining that the customer has been informed of all the under-used product feature, the process flows to 552. In 552, it is indicated that a review is required, and the process ends.

In response to determining that all under-used product features are not being tracked, control passes to 554. In 554, tracking of the metric parameter is implemented. For example, computer program code is generated to define and include new metric parameters (e.g., as part of look-up table) and to log, track, and update their states (e.g., as part of generating customer adoption data). In 556, triggers are provided for the under-used product features, and the process ends. For example, triggers are provided to a computer program to start a service routine to provide training appropriate to the trigger type and under-used product feature, and the process ends.

What is claimed is:

1. A system for triggering based on analytics, comprising:
a storage device configured to store customer adoption data;
a processor configured to:
receive the customer adoption data;
determine an under-used product feature based at least in part on the customer adoption data, wherein the under-used product feature is linked to one or more of a key performance indicator (KPI) associated with a customer and output files of a type, wherein the customer adoption data is stored in the storage device, comprising to:
determine whether an adoption metric exceeds a threshold, wherein the adoption metric comprises a percentage improvement in the key performance indicator, a number of the output files of the type generated, or a combination thereof; and
in response to a determination that the adoption metric does not exceed the threshold, indicate the product feature is an under-used product feature;
determine a trigger for training the under-used product feature based at least in part on the customer adoption data; and
set the trigger for training, wherein setting the trigger for training comprises automatically executing a service routine that provides to the customer training associated with customer adoption of the under-used product feature.

2. The system as in claim 1, wherein determining the customer adoption data comprises determining a state of a metric parameter, wherein the metric parameter is used to determine whether a product feature has been installed, enabled, adopted, and/or is being sufficiently used.

3. The system as in claim 2, wherein determining whether the product feature has been adopted comprises determining whether the product feature is being used above a first threshold level, and wherein determining whether the product feature is being sufficiently used comprises determining whether the product feature is being used above a second threshold level.

4. The system as in claim 2, wherein determining the state of the metric parameter comprises determining a state of one or more of the following: an installation metric, an enablement metric, the adoption metric, and/or a usage metric.

5. The system as in claim 1, wherein determining the under-used product feature comprises determining a linkage to the key performance indicator and/or a value driver.

6. The system as in claim 1, wherein the training is automatically executed for an employee with one or more roles related to an adoption of the under-used product feature.

7. The system as in claim 6, wherein the one or more roles is determined based at least in part on the customer adoption data.

8. The system as in claim 6, wherein the one or more roles is determined based at least in part on determining whether an employee is currently certified for using the under-used product feature.

9. The system as in claim 1, wherein the training includes certification training.

10. The system as in claim 1, wherein the training includes providing a hint.

11. The system as in claim 1, wherein the training is regarding a software functionality already enabled in the system.

12. The system as in claim 1, wherein the training is regarding a new software functionality not enabled in the system.

13. The system as in claim 1, wherein the service routine automatically installs a new software functionality not installed in the system based at least in part on the customer adoption data.

14. The system as in claim 1, wherein the service routine automatically enables a new software functionality not enabled in the system based at least in part on the customer adoption data.

15. The system as in claim 1, wherein the service routine automatically disables a software functionality enabled in the system based at least in part on the customer adoption data.

16. The system as in claim 1, further comprising automatically logging usage data for a software functionality enabled in the system based at least in part on the customer adoption data.

17. The system as in claim 1, further comprising determining a report based on the customer adoption data.

18. The system as in claim 10, wherein the hint or the training informs the customer how the under-used product feature links to the one or more of the key performance indicator (KPI) and the output files of the type.

19. A method for triggering based on analytics, comprising:
  receiving customer adoption data;
  determining, using a processor, an under-used product feature based at least in part on the customer adoption data, wherein the under-used product feature is linked to one or more of a key performance indicator (KPI) associated with a customer and output files of a type, wherein the customer adoption data is stored in a storage device, comprising:
    determining whether an adoption metric exceeds a threshold, wherein the adoption metric comprises a percentage improvement in the key performance indicator, a number of the output files of the type generated, or a combination thereof; and
    in response to a determination that the adoption metric does not exceed the threshold, indicating the product feature is an under-used product feature;
  determining a trigger for training the under-used product feature based at least in part on the customer adoption data; and
  setting the trigger for training, wherein setting the trigger for training comprises automatically executing a service routine that provides to the customer training associated with customer adoption of the under-used product feature.

20. A computer program product for triggering based on analytics, the computer program product being embodied in a non-transitory computer readable storage medium and comprising computer instructions for:
  receiving customer adoption data;
  determining, using a processor, an under-used product feature based at least in part on the customer adoption data, wherein the under-used product feature is linked to one or more of a key performance indicator (KPI) associated with a customer and output files of a type, wherein the customer adoption data is stored in a storage device, comprising:
    determining whether an adoption metric exceeds a threshold, wherein the adoption metric comprises a percentage improvement in the key performance indicator, a number of the output files of the type generated, or a combination thereof; and
    in response to a determination that the adoption metric does not exceed the threshold, indicating the product feature is an under-used product feature;
  determining a trigger for training the under-used product feature based at least in part on the customer adoption data; and
  setting the trigger for training, wherein setting the trigger for training comprises automatically executing a service routine that provides to the customer training associated with customer adoption of the under-used product feature.

* * * * *